United States Patent
Stimple et al.

[19]

[11] Patent Number: 6,137,925
[45] Date of Patent: Oct. 24, 2000

[54] MULTI-WAVELENGTH POLARIZATION SCRAMBLING DEVICE

[75] Inventors: James R. Stimple, Santa Rosa; Dennis Derickson, Windsor, both of Calif.; Eugene Rudkevich, Tuscon, Ariz.

[73] Assignee: Agilent Technologies Inc., Palo Alto, Calif.

[21] Appl. No.: 09/198,903

[22] Filed: Nov. 24, 1998

[51] Int. Cl.$^7$ .................................................. G02B 6/00
[52] U.S. Cl. ........................................................ 385/11
[58] Field of Search .............................. 385/11, 122, 27, 385/88, 24

[56] References Cited

U.S. PATENT DOCUMENTS

| | | | |
|---|---|---|---|
| 5,949,925 | 9/1999 | Seino | 385/1 |
| 5,970,188 | 10/1999 | Peltz, Jr. | 385/27 |
| 6,038,357 | 3/2000 | Pan | 385/24 |

OTHER PUBLICATIONS

Nirio Kashima, Passive Optical Components for Optical Fiber Transmission, Library of Congress Cataloging–in–Publication Data, Artech House Inc. 1995 (p. 216).

Peter K. Cheo, Fiber Optics and Optoelectronics, Prentice Hall, Sep. 3, 1991, Ch. 4 (pp. 41–72).

*Primary Examiner*—Frank G. Font
*Assistant Examiner*—Layla Lauchman
*Attorney, Agent, or Firm*—John L. Imperato

[57] ABSTRACT

A polarization scrambling device randomly varies the polarization states of multiple applied optical signals. The scrambling device includes a polarization scrambler coupled to a wavelength-dependent polarization randomizer having cascaded birefringent elements in which the axes of polarization of the cascaded elements are rotationally offset. The scrambling device causes random variations in the relative and the absolute polarization states of the applied optical signals. The birefringence, lengths, and number of cascaded birefringent elements are chosen to assure that the polarization states of optical signals at the different wavelengths are sufficiently randomized, even when the applied optical signals are closely spaced in frequency.

19 Claims, 2 Drawing Sheets

MULTI-WAVELENGTH POLARIZATION SCRAMBLING DEVICE

BACKGROUND OF THE INVENTION

Erbium doped fiber amplifiers (EDFAs) are a critical component of dense wavelength division multiplexed (DWDM) optical telecommunication systems. EDFAs amplify simultaneously applied optical signals that have different optical wavelengths within the operating wavelength range of the DWDM system. As trends to expand the channel capacity of DWDM systems increase the operating wavelength range of the systems, the performance limitations of the EDFAs are exploited and become more determinative of the performance of the DWDM systems in which the EDFAs are used. As a result, monitoring and designing modern DWDM systems rely upon accurate characterization of the EDFAs. However, nonlinearities and inhomogeneities in the EDFAs place stringent demands on the optical stimulus signals and measurements used to characterize the EDFAs. For example, to accommodate for effects such as polarization hole burning (PHB) when characterizing gain of an EDFA, measurements are performed and then averaged as the polarization states of the simultaneously applied optical stimulus signals at each wavelength are randomly varied. To assure that both the relative and absolute polarization states of the optical stimulus signals are sufficiently randomized, each optical signal is applied to a separate polarization scrambler. The randomized optical signals are then combined and applied to the EDFA. While this scheme provides optical stimulus signals well suited for characterizing EDFAs, it involves multiple polarization scramblers, one for each of the simultaneously applied optical signals, thereby increasing the cost and complexity of characterizing EDFAs.

To reduce the cost and complexity of providing optical stimulus signals, alternate schemes first combine the multiple optical signals at the different wavelengths and then time-vary the polarization states of the combined signals using a single polarization scrambler. While these schemes randomly vary the absolute polarization states of the multiple optical signals, unless random variations in the relative polarization states of the optical signals are also introduced, the polarization states of the optical stimulus signals remain correlated and the signals are insufficiently randomized to accommodate for PHB when used to characterize EDFAs. Accordingly, there is a need for a scrambling device that has low cost and complexity and that randomizes relative and absolute polarization states of simultaneously applied optical signals having different wavelengths.

SUMMARY OF THE INVENTION

A polarization scrambling device constructed according to the preferred embodiment of the present invention randomly varies the polarization states of simultaneously applied optical signals having different wavelengths. The scrambling device includes a polarization scrambler coupled to a wavelength-dependent polarization randomizer implemented using cascaded birefringent elements in which the polarization axes of the cascaded elements are rotationally offset. The scrambling device causes both the relative and absolute polarization states of the optical signals to vary randomly as a function of time, providing stimulus signals that are well suited for characterizing erbium doped fiber amplifiers. In one example, the cascaded birefringent elements include three lengths of birefringent optical fiber, fusion spliced so that the polarization axes of successive fibers in the cascade are progressively offset. The birefringence, lengths, and number of cascaded birefringent elements are chosen to assure that the polarization states of optical signals at the different wavelengths are sufficiently randomized, even when the applied optical signals are closely spaced in frequency, as are adjacent channels within dense wavelength division multiplexed systems.

DETAILED DESCRIPTION OF THE PREFERRED EMBODIMENT

Figure 1:
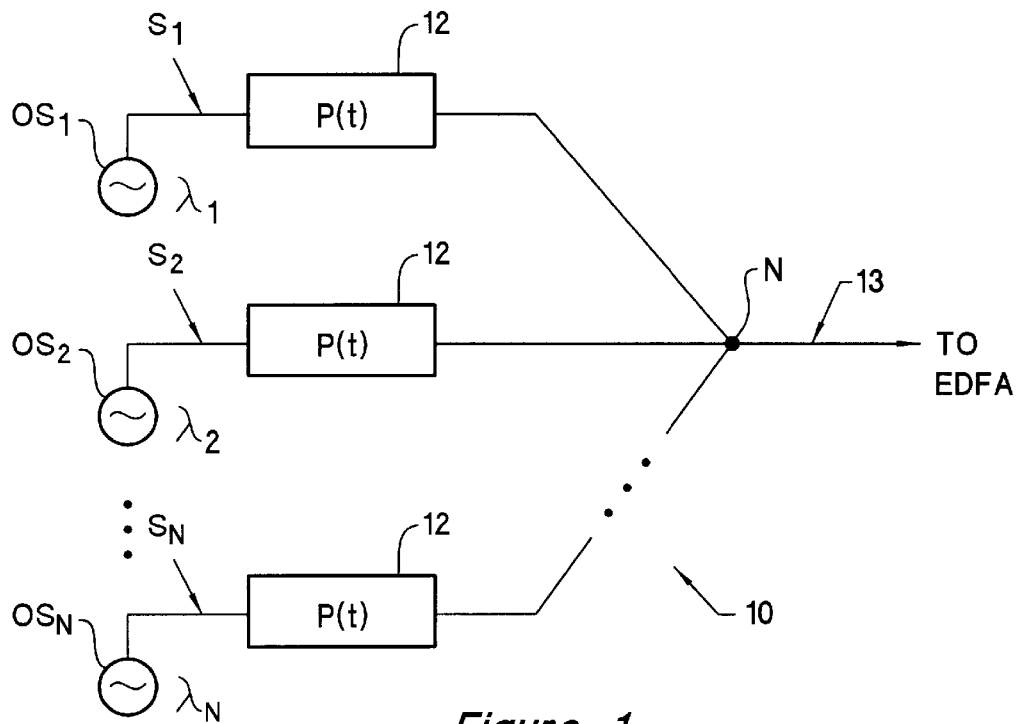
FIG. 1 shows a prior art scheme for randomizing polarization states of applied optical signals having different wavelengths.

FIG. 1 shows a prior art scheme 10 for randomizing polarization states of applied optical signals $S_1, S_2 \ldots S_N$ having different optical wavelengths $\lambda_1, \lambda_2 \ldots \lambda_N$. The optical signals are provided to the system by an array of optical sources $OS_1, OS_2 \ldots OS_N$ and each optical signal $S_1, S_2 \ldots S_N$ is applied to a corresponding polarization scrambler 12, such as a Hewlett-Packard 11896A Polarization Controller available from Hewlett-Packard Company. Each polarization scrambler 12 has a transfer function P(t) and provides random time-variations to the polarization of the optical signal applied to the polarization scrambler 12 so that when the optical signals are combined at node N to produce combined signal 13, the relative and absolute polarization states of the optical signals $S_1, S_2 \ldots S_N$ at the various wavelengths $\lambda_1, \lambda_2 \ldots \lambda_N$ in the combined signal 13 are randomized as a function of time. This scheme 10 relies on multiple polarization scramblers 12 to assure that the relative and absolute states of polarization of the optical signals $S_1, S_2 \ldots S_N$ are sufficiently randomized within the signal 13.

Figure 2:
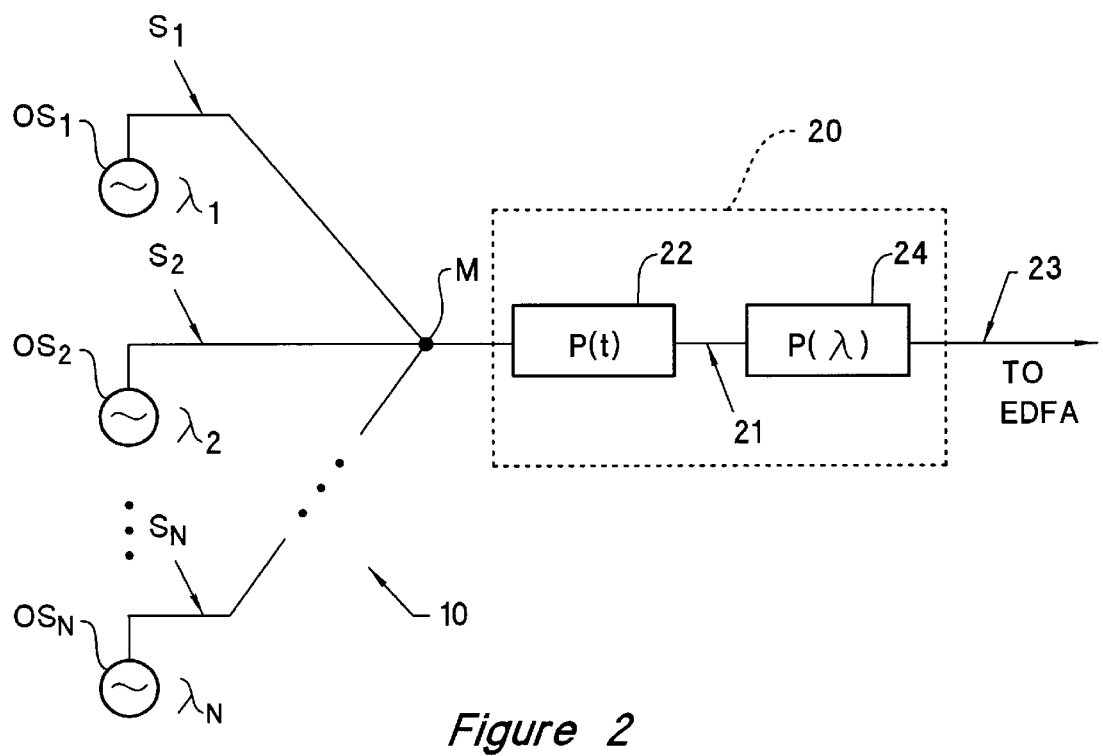
FIG. 2 shows a multi-wavelength polarization scrambling device, including a wavelength-dependent polarization randomizer and a time-varying polarization scrambler, constructed according to the preferred embodiment of the present invention.

FIG. 2 shows a multi-wavelength polarization scrambling device 20 constructed according to the preferred embodiment of the present invention. The scrambling device 20 includes a polarization scrambler 22 that receives optical signals $S_1, S_2 \ldots S_N$ having corresponding different wavelengths $\lambda_1, \lambda_2 \ldots \lambda_N$ provided by sources $OS_1, OS_2 \ldots OS_N$. The polarization scrambler 22 introduces random time-variations to the state of polarization (SOP) of the optical signals $S_1, S_2 \ldots S_N$ combined at node M. The polarization scrambler 22 has transfer function P(t) and operates on the optical signals $S_1, S_2 \ldots S_N$ to randomize the absolute SOPs of the optical signals at each of the different wavelengths $\lambda_1, \lambda_2 \ldots \lambda_N$.

The output of the polarization scrambler 22 is coupled to a wavelength-dependent polarization randomizer 24 having a transfer function $P(\lambda)$. The wavelength-dependent polarization randomizer 24 operates on the optical signals 21 received from the polarization scrambler 22 and introduces random variations to the relative SOPs of the optical signals 21 according to the wavelength separations of the optical signals. The polarization scrambler 22 cascaded with the wavelength-dependent polarization randomizer 24 randomly varies the absolute SOPs of the optical signals $S_1$, $S_2 \ldots S_N$ as a function of time, and randomly varies the relative SOPs of optical signals $S_1, S_2 \ldots S_N$ at the different wavelengths $\lambda_1, \lambda_2 \ldots \lambda_N$ applied to the polarization scrambling device 20. The wavelength-dependent polarization randomizer 24 is designed so that the SOPs of the output signal 23 at the different wavelengths $\lambda_1, \lambda_2 \ldots \lambda_N$ of the applied signals $S_1, S_2 \ldots S_N$ are substantially uncorrelated. The output signal 23 is well-suited for testing optical components such as erbium doped fiber amplifiers (EDFAs) used within dense wavelength division multiplexed (DWDM) systems. For example, when the optical signals $S_1, S_2 \ldots S_N$ applied to the scrambling device 20 have wavelengths $\lambda_1, \lambda_2 \ldots \lambda_N$ corresponding to the channel wavelengths within a DWDM system, repeatable gain measurements for EDFAs are obtained—even in the presence of polarization hole burning (PHB) and other wavelength localized effects since the randomized SOPs provided by the polarization scrambling device 20 enable averaging of the gain measurements over a distribution of random SOPs of the stimulus signal 23.

The polarization scrambler 22 is implemented using a fiber-based scrambler such as the Hewlett-Packard 11896A Polarization Controller available from Hewlett-Packard Company, or any other type of polarization scrambler 22 that randomizes the SOP of applied optical signals $S_1, S_2 \ldots S_N$ as a function of time. The wavelength-dependent polarization randomizer 24 is implemented with a cascade of birefringent elements that are optically coupled and that have axes of polarization that are rotationally offset. The cascade of birefringent elements are implemented using bulk optics, such as quartz or calcite plates. Alternatively, the birefringent elements are fusion-spliced birefringent optical fibers such as polarization-maintaining fibers available from Fujikura Ltd. A single length of birefringent fiber, stressed so that the polarization axes are rotationally offset at various positions along the length of the fiber is another alternative implementation of the cascade of birefringent elements.

The rotational offset of the polarization axes of the birefringent elements assures that randomization of the relative SOPs of the optical signal 21 is independent of the absolute state of polarization of the optical signal 21 as received from the polarization scrambler 22 by the wavelength-dependent polarization randomizer 24. Typically, the polarization axes of successive birefringent elements in the cascade are rotationally offset so that the corresponding axis, such as the fast axis of polarization, of each successive element is offset by approximately 45 degrees divided by the number of cascaded birefringent elements minus one. As examples, when the wavelength-dependent polarization randomizer 24 includes two birefringent elements, the fast axes of polarization of the elements are offset by approximately 45 degrees. When the wavelength-dependent polarization randomizer includes three birefringent elements, the fast axes of polarization of the elements are offset by approximately 22.5 degrees.

Figure 3:
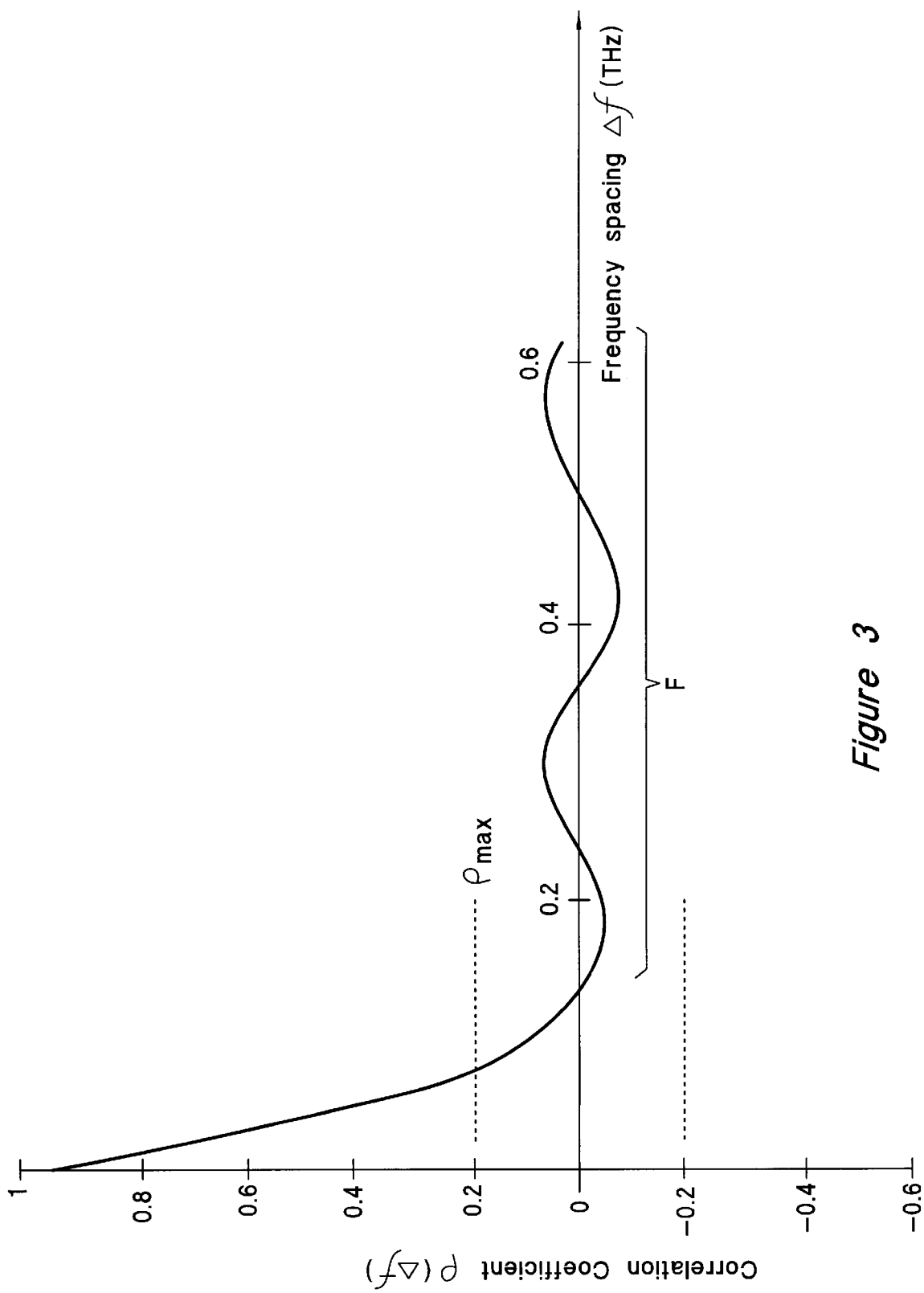
FIG. 3 shows the correlation between states of polarization of optical signals applied to the wavelength-dependent polarization randomizer included in FIG. 2, versus the frequency spacing of the applied optical signals.

FIG. 3 shows the correlation coefficient $\rho(\Delta f)$ between SOPs of the stimulus signal 23 as a function of frequency spacing $\Delta f$, resulting from the application of the optical signal 21 to the wavelength-dependent polarization randomizer 24. The optical signal 21 is the combination of the optical signals $S_1, S_2 \ldots S_N$ at corresponding wavelengths $\lambda_1, \lambda_2 \ldots \lambda_N$ after random time variations to the SOPs of the signals have been introduced by the polarization scrambler 22. The frequency spacing $\Delta f$ corresponds to the wavelength separation of the applied optical signals $S_1, S_2 \ldots S_N$ at the wavelengths $\lambda_1, \lambda_2 \ldots \lambda_N$. Generally, the correlation coefficient $\rho(\Delta f)$ of the SOPs increases as the frequency spacing $\Delta f$ between the signals decreases, and increases as the total differential group delay of the cascade of birefringent elements decreases. Differential group delay is the difference in propagation time through a birefringent element for optical signals polarized in alignment with the different principal polarization axes, such as the fast and slow axes, of the birefringent element. The total differential group delay represents the sum of the differential group delays of the individual birefringent elements in the cascade. The differential group delay depends on the difference in propagation velocities between the polarization axes, such as the fast and slow axis of the birefringent elements, the propagation lengths of the birefringent elements, and the number of birefringent elements.

When the output signal 23 provides a stimulus signal for testing optical components such as EDFAs, it is desirable that the magnitude of the correlation coefficient $\rho(\Delta f)$ not exceed a designated value $\rho_{max}$ for frequency spacings $\Delta f$ greater than the frequency separation of channels within a DWDM system. For example, a $\rho_{MAX}$ not exceeding 0.2 assures that the SOPs of the optical signals within the output signal 23 are sufficiently uncorrelated to achieve repeatable EDFA gain measurements in the presence of PHB. To achieve this correlation coefficient at a frequency spacing $\Delta f=100$ GHz, which corresponds to the channel spacing of a typical DWDM system, the total differential group delay of the optical signals through the cascade of birefringent elements is adjusted to be at least 2.4 ps. When testing EDFAs it is also desirable that $\rho_{MAX}$ not exceed 0.2 over a wavelength segment within the 1525–1575 nm operating range of a DWDM system, that is greater than a Stark line of an EDFA. This is achieved by staggering propagation lengths through the cascaded birefringent elements to correspondingly adjust the individual differential group delays. When bulk optics are used, propagation length through each of the birefringent elements is determined by the element's thickness. When fusion spliced fibers are used, propagation length through each of the birefringent elements is determined by the fiber's length. The propagation lengths of birefringent elements are adjusted so that the propagation length through each of the birefringent elements are non-integer multiples of each other. This staggering of propagation lengths prevents the polarization states of the output signal 23 from becoming highly correlated at periodic frequency spacings of the applied optical signal 21, assuring that $\rho_{MAX}$ does not exceed 0.2 over a predetermined wavelength segment F. As an example, when the wavelength-dependent polarization randomizer 24 is implemented using three lengths of fusion spliced birefringent fiber, the length of the first fiber is chosen 0.8 times the length of the second fiber in the cascade and the third fiber is chosen 0.6 times the length of the second fiber in the cascade, $\rho_{MAX}$ does not exceed a predefined value, such as 0.2, over a predetermined wavelength segment F that is greater than a Stark line of an EDFA.

The correlation coefficient $\rho(\Delta f)$ is determined by the wavelength-dependent polarization randomizer 24 and is described in terms of the wave parameters of the polarization components of optical signals 21. The X-polarized component $E_X$ of the applied optical signal, aligned with a first axis, is represented by the wave equation;

$$E_X = A_X e^{j\Theta x}.$$

Similarly, the Y-polarized component $E_Y$ of the applied optical signal, aligned with a second axis perpendicular to the first axis, is represented by the wave equation;

$$E_Y = A_Y \, e^{j\theta_Y}.$$

$A_X$ represents the amplitude of the X-polarized component $E_X$ and $A_Y$ represents the amplitude of the Y-polarized component. The amplitudes $A_X$ and $A_Y$ are related so that $A_X^2 + A_Y^2 = 1$. $\theta_X$ and $\theta_Y$ represent the optical phases of the X-polarized and Y-polarized components $E_X$ and $E_Y$, respectively. Differential group delay is determined by the differential optical phase $\Delta\theta = \theta_X - \theta_Y$, which depends on the difference in propagation velocity along the fast and slow axes of polarization and on the propagation lengths through the birefringent elements.

The correlation coefficient $\rho(\Delta f)$, from which $\rho_{MAX}$ is designated, equals $\rho_{\Delta\theta}(\Delta f)^*(\rho_{AX}(\Delta f) + \rho_{AY}(\Delta f))/2$, where $\rho_{\Delta\theta}(\Delta f)$ equals $\rho\{\Delta\theta(f), \Delta\theta(f+\Delta f)\}$, the correlation between the differential optical phase $\Delta\theta$ between the optical signals at frequencies f and f+$\Delta$f. The correlation $\rho_{AX}(\Delta f)$ equals $\rho\{A_X(f), A_X(f+\Delta f)\}$, the correlation between amplitudes $A_X$ of the X-polarized components $E_X$ at frequencies f and f+$\Delta$f, and the correlation $\rho_{AY}(\Delta f)$ equals $\rho\{A_Y(f), A_Y(f+\Delta f)\}$, the correlation between amplitudes $A_Y$ of the Y-polarized components $E_Y$ at different frequencies, f and f+$\Delta$f. The value $\rho_{MAX}$ is achieved for a designated wavelength or corresponding frequency segment F by staggering differential group delay of the individual birefringent elements and the value $\rho_{MAX}$ is achieved for a designated wavelength or corresponding frequency spacing $\Delta$f by adjusting the total differential group delay of the birefringent elements.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. A polarization scrambling device for randomizing the relative and absolute polarization states of at least two optical signals having different wavelengths and a corresponding frequency spacing, comprising:
    a polarization scrambler receiving the optical signals and randomly adjusting the absolute polarization states of the optical signals as a function of time; and
    a polarization randomizer coupled to the polarization scrambler, receiving the optical signals having the randomly adjusted absolute polarization states, the polarization randomizer including at least two coupled birefringent elements, each birefringent element having a fast axis of polarization and a slow axis of polarization, the fast axis of polarization of a first birefringent element of the at least two coupled birefringent elements rotationally offset from the fast axis of polarization of a second birefringent element of the at least two coupled birefringent elements and rotationally offset from the slow axis of polarization of the second birefringent element of the at least two coupled birefringent elements, the coupled birefringent elements varying the relative polarization states of the optical signals having the randomly adjusted absolute polarization states according to the frequency spacing of the optical signals when the optical signals having the randomly adjusted absolute polarization states propagates through the coupled birefringent elements.

2. The polarization scrambling device of claim 1 wherein the differential group delay of the at least two coupled birefringent elements is sufficiently large so that the magnitude of the correlation between the relative polarization states of the optical signals does not exceed a predefined value when a predetermined frequency spacing between the received optical signals is exceeded.

3. The polarization scrambling device of claim 2 wherein the differential group delay of the at least two coupled birefringent elements is made sufficiently large by adjusting the differential propagation velocities between the fast and slow axes of the at least two birefringent elements.

4. The polarization scrambling device of claim 2 wherein the differential group delay of the at least two coupled birefringent elements is made sufficiently large by adjusting the propagation lengths through the at least two birefringent elements.

5. The polarization scrambling device of claim 1 wherein the number of birefringent elements in the at least two coupled birefringent elements is sufficiently large so that the magnitude of the correlation between the relative polarization states of the optical signals does not exceed a predefined value when a predetermined frequency spacing between the received optical signals is exceeded.

6. The polarization scrambling device of claim 2 wherein the fast axes of the at least two coupled birefringent elements are rotationally offset by approximately forty five degrees divided by the number of coupled birefringent elements minus one.

7. The polarization scrambling device of claim 5 wherein the fast axes of the at least two coupled birefringent elements are rotationally offset by approximately forty five degrees divided by the number of coupled birefringent elements minus one.

8. The polarization scrambling device of claim 2 wherein the at least two coupled birefringent elements include bulk optic elements.

9. The polarization scrambling device of claim 5 wherein the at least two coupled birefringent elements include bulk optic elements.

10. The polarization scrambling device of claim 2 wherein the at least two coupled birefringent elements includes fusion-spliced birefringent optical fibers.

11. The polarization scrambling device of claim 5 wherein the at least two coupled birefringent elements includes fusion-spliced birefringent optical fibers.

12. The polarization scrambling device of claim 1 wherein the differential group delay of each of the at least two birefringent elements is staggered so that the magnitude of correlation between the polarization states of the optical signals does not exceed a predefined value over a predetermined frequency segment.

13. The polarization scrambling device of claim 12 wherein the differential group delay of each of the at least two birefringent elements is staggered by adjusting the differential propagation velocities between the fast and slow axes of the at least two birefringent elements.

14. The polarization scrambling device of claim 12 wherein the differential group delay of each of the at least two birefringent elements is staggered by adjusting the propagation lengths through the at least two birefringent elements.

15. A method for randomizing the relative and absolute polarization states of at least two optical signals having different wavelengths and a corresponding frequency spacing, comprising the steps of:
    randomly adjusting the absolute polarization states of the optical signals as a function of time; and
    varying the relative polarization states of the randomly adjusted optical signals according to the frequency spacing of the optical signals by introducing a differential group delay to the optical signals based on polarization components of the polarization states of the adjusted optical signals.

16. The method of claim 15 wherein introducing a differential group delay to the optical signals includes applying the optical signals to at least two birefringent elements each having a fast axis of polarization and a slow axis of polarization, the fast axis of a first birefringent element of the at least two birefringent elements rotationally offset from the fast axis and the slow axis of a second birefringent element of the at least two birefringent elements.

17. The method of claim 15 wherein the differential group delay is sufficiently large so that a predefined correlation between polarization states of the optical signals is not exceeded when a predetermined frequency spacing between the optical signals is exceeded.

18. The method of claim 15 wherein introducing a differential group includes providing a first difference in propagation velocity between components of the optical signals aligned with a first polarization axis and aligned with a second polarization axis, and providing a second difference in propagation velocity between components of the optical signals aligned with the first polarization axis and aligned with the second polarization axis whereby the ratio of the first difference in propagation velocity to the second difference in propagation velocity is a non-integer and the ratio of the second difference in propagation velocity to the first difference in propagation velocity is a non-integer.

19. The method of claim 18 wherein the differential group delay is sufficiently large so that a predefined correlation between polarization states of the optical signals is not exceeded when a predetermined frequency spacing between the optical signals is exceed.

* * * * *